(12) United States Patent
Evertt et al.

(10) Patent No.: US 9,336,625 B2
(45) Date of Patent: May 10, 2016

(54) OBJECT REFINEMENT USING MANY DATA SETS

(75) Inventors: Jeffrey Jesus Evertt, Kirkland, WA (US); Justin Avram Clark, Kirkland, WA (US); Christopher Harley Willoughby, Kenmore, WA (US); Joel Deaguero, Snohomish, WA (US); Relja Markovic, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 1201 days.

(21) Appl. No.: 13/280,773

(22) Filed: Oct. 25, 2011

(65) Prior Publication Data

US 2013/0100119 A1   Apr. 25, 2013

(51) Int. Cl.
*G06T 17/00* (2006.01)
*G06K 9/00* (2006.01)
*G06T 7/00* (2006.01)
*G06F 17/30* (2006.01)

(52) U.S. Cl.
CPC .......... *G06T 17/00* (2013.01); *G06F 17/30265* (2013.01); *G06K 9/00201* (2013.01); *G06T 7/0057* (2013.01); *G06T 2200/04* (2013.01); *G06T 2200/08* (2013.01); *G06T 2207/10024* (2013.01); *G06T 2207/10028* (2013.01); *G06T 2207/20212* (2013.01)

(58) Field of Classification Search
CPC ....... G06T 17/00; G06T 19/00; G06T 19/006; G06T 15/00; G06K 9/3241; G06K 9/4671
USPC ................. 345/419, 420, 633, 473, 619, 424; 382/154; 703/2; 700/98, 118
See application file for complete search history.

(56) References Cited

U.S. PATENT DOCUMENTS

| | | | |
|---|---|---|---|
| 6,259,815 B1 | 7/2001 | Anderson et al. | |
| 6,816,629 B2 * | 11/2004 | Redlich .......................... | 382/285 |
| 6,827,266 B2 | 12/2004 | Mergenthaler et al. | |
| 7,805,003 B1 | 9/2010 | Cohen et al. | |
| 2009/0129668 A1 | 5/2009 | Chi | |
| 2009/0279784 A1 * | 11/2009 | Arcas et al. ................... | 382/190 |
| 2010/0046704 A1 | 2/2010 | Song et al. | |
| 2011/0049235 A1 | 3/2011 | Gerigk et al. | |
| 2011/0150321 A1 * | 6/2011 | Cheong et al. ................. | 382/154 |
| 2011/0255746 A1 * | 10/2011 | Berkovich et al. ............. | 382/103 |

OTHER PUBLICATIONS

Kumar, et al., "A Simple Region Descriptor based on Object Area per Scan Line", In Proceedings of International Journal of Computer Applications (0975-8887), vol. 3, No. 7, Jun. 2010, pp. 24-27, http://www.ijcaonline.org/volume3/number7/pxc3871048.pdf.

Steder, et al., "Robust On-line Model-based Object Detection from Range Images", 2009 IEEE/RSJ International Conference on Intelligent Robots and Systems, Oct. 10-15, 2009, pp. 4739-4744; http://www.informatik.uni-freiburg.de/~grisetti/pdf/steder09iros.pdf.

* cited by examiner

*Primary Examiner* — Jeffrey Chow
(74) *Attorney, Agent, or Firm* — Aaron Chatterjee; Judy Yee; Micky Minhas

(57) ABSTRACT

Digitizing objects in a picture is discussed herein. A user presents the object to a camera, which captures the image comprising color and depth data for the front and back of the object. The object is recognized and digitized using color and depth data of the image. The user's client queries a server managing images uploaded by other users for virtual renditions of the object, as recognized in the other images. The virtual renditions from the other images are merged with the digitized version of the object in the image captured by the user to create a composite rendition of the object.

20 Claims, 19 Drawing Sheets

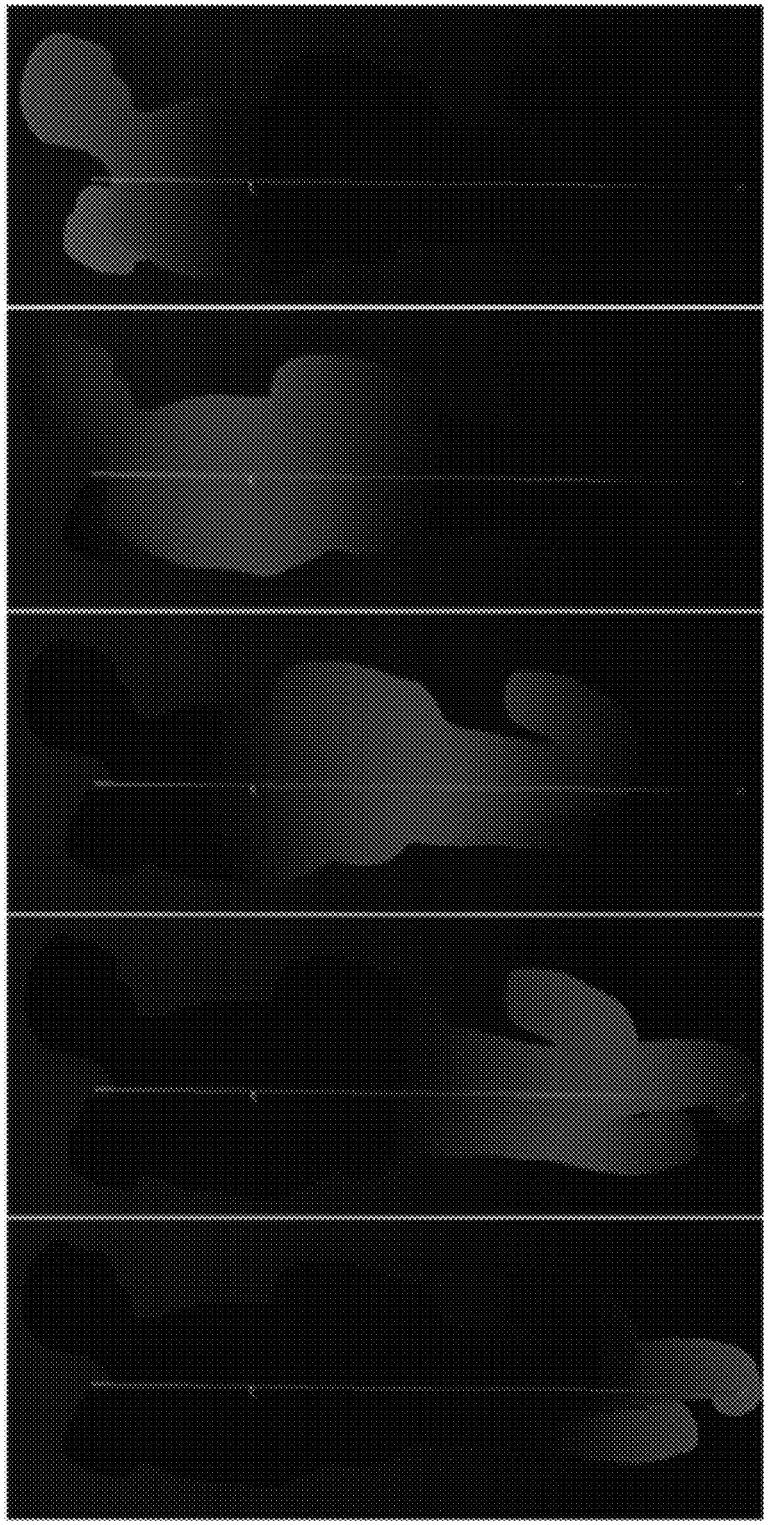

 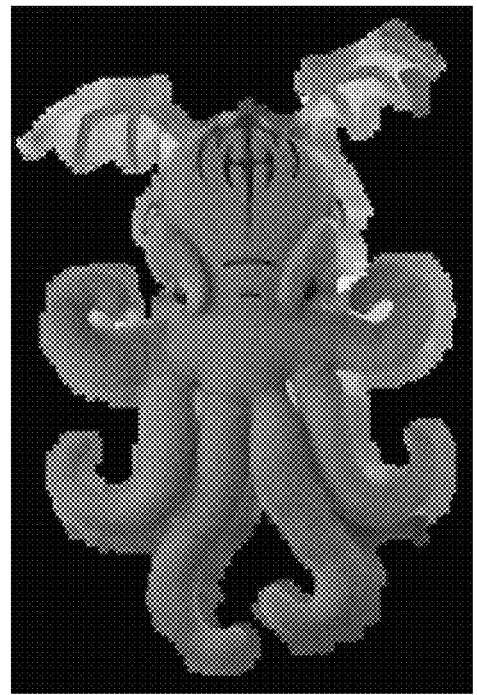
FIG. 20A    FIG. 20B
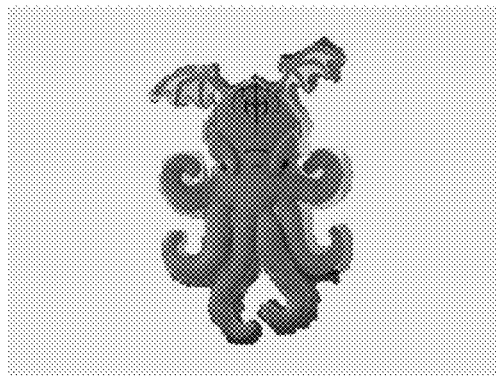 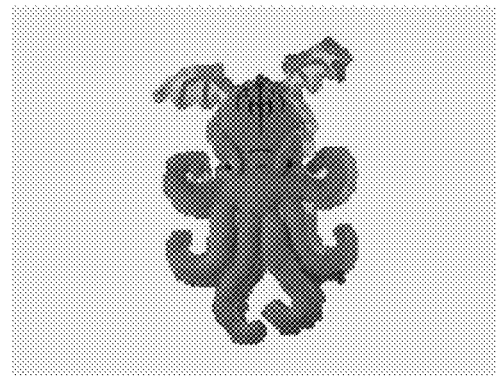
FIG. 21A    FIG. 21B

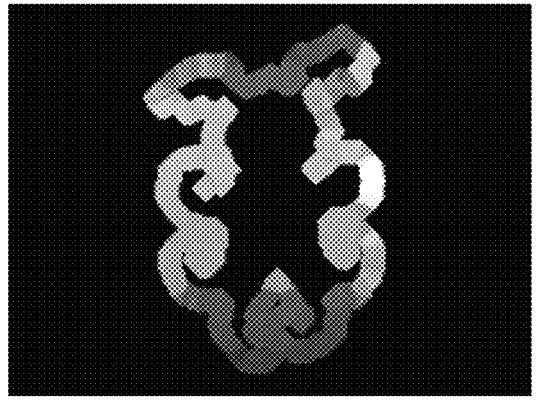
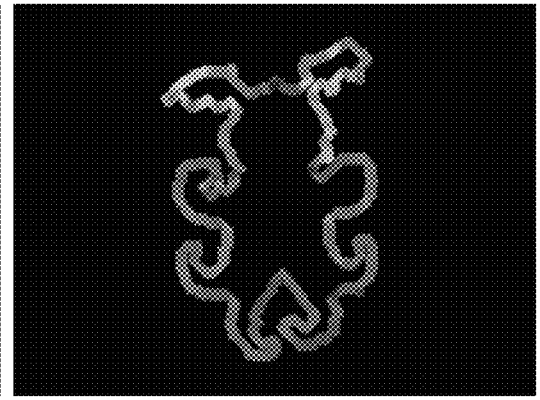
FIG. 22A    FIG. 22B
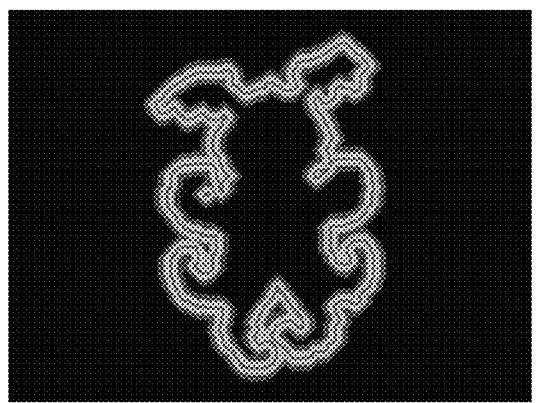
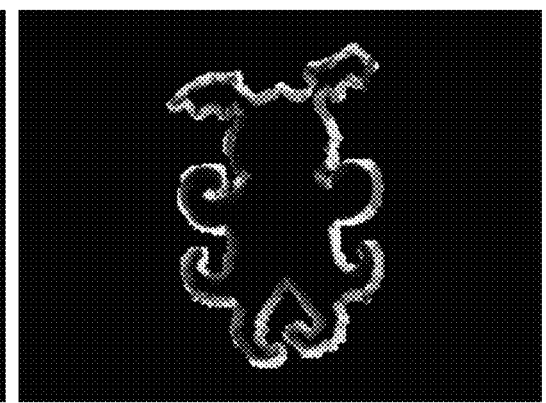
FIG. 23A    FIG. 23B

OBJECT REFINEMENT USING MANY DATA SETS

BACKGROUND

Modern gaming and Internet technologies interact with users in far more personal ways than the older technologies have in the past. Instead of simply hitting buttons on a controller connected to a game console, today's gaming systems can read movements of players standing in front of cameras or actions players take with wireless controllers (e.g., swinging a controller like a baseball bat). This personal interaction opens up an entire new realm of gaming.

Graphics have also progressed a long way as well. Three-dimensional renderings give a realistic feel to games, movies, presentations, and other areas where graphics are used. For example, modern-day children's movies have evolved from cartoons like Walt Disney's Fantasia to computer-animated movies like Pixar's Toy Story series. Such progression can be attributed, at least in part, to advancements in the computer and graphic technologies, such as faster general processing units (GPUs), larger and more accessible memory, pipelining, and the like. As graphic-processing continues to evolve and underlying technology becomes more mainstream, advanced graphics-rendering will become a part of different technological areas.

Cloud computing frees computers from the confines of their own memories. Instead of a user needing to save every important document, image, video, audio, or other file on a local hard drive, the user can upload files to servers for storage in a virtually infinitesimal and perpetual memory structure. Allowing users to upload media and files to networked servers also provides an avenue for easily sharing such media and files between users.

SUMMARY

This summary is provided to introduce a selection of concepts in a simplified form that are further described below in the Detailed Description. This summary is not intended to identify key features or essential features of the claimed subject matter. Nor is this summary intended to be used as an aid in determining the scope of the claimed subject matter.

One aspect is directed to creating a digital representation (a "digitization") of an object in an image. A user presents the object to a camera, which captures the image comprising color and depth data for the front and back of the object. For both front and back images, the closest point to the camera is determined by analyzing the depth data. From the closest points, edges of the object are found by noting large differences in depth data. The depth data is also used to construct point cloud constructions of the front and back of the object. Various techniques are applied to extrapolate edges, remove seams, extend color intelligently, filter noise, apply skeletal structure to the object, and optimize the digitization further. Eventually, a digital representation is presented to the user and potentially used in different applications (e.g., games, Web, etc.).

Another aspect is directed to using multiple virtual or 3D renditions of an object, generated from different images uploaded to a server, along with an image of the image captured by the user to create a composite rendition of the image. The user takes a picture of the image, and recognition software identifies the object in the picture. A server manages images uploaded by other users, identifying objects recognized in the images. The client computing device or camera being used by the user queries the server for images with the object recognized in the picture. The server returns either the images or virtual renditions of the objects from the images to the client computing device or camera. The images or virtual renditions are merged with a virtual rendition of the object in the picture to create a composite image. Using the images of others allows the user to digitize the object at a high quality without having to take pictures of every angle of the object.

BRIEF DESCRIPTION OF THE SEVERAL VIEWS OF THE DRAWINGS

Illustrative embodiments of the present invention are described in detail below with reference to the attached drawing figures, and wherein:

FIGS. 19A-19E is a diagram of diagrams illustrating weighting added to the different bones of a generated skeletal structure, according to one embodiment.

FIGS. 20A and 20B is a diagram of diagrams of images before and after luma/chroma processing, according to one embodiment.

FIGS. 21A and 21B is a diagram of diagrams of source and output images after edges are filtered, according to one embodiment.

FIGS. 22A and 22B is a diagram of diagrams of images where the edge repair filter finds background colors and which and target colors, according to one embodiment.

FIGS. 23A and 23B is a diagram of images showing distance from an edge to a disputed region and calculated background likelihood values, according to one embodiment.

DETAILED DESCRIPTION

Figure 1:
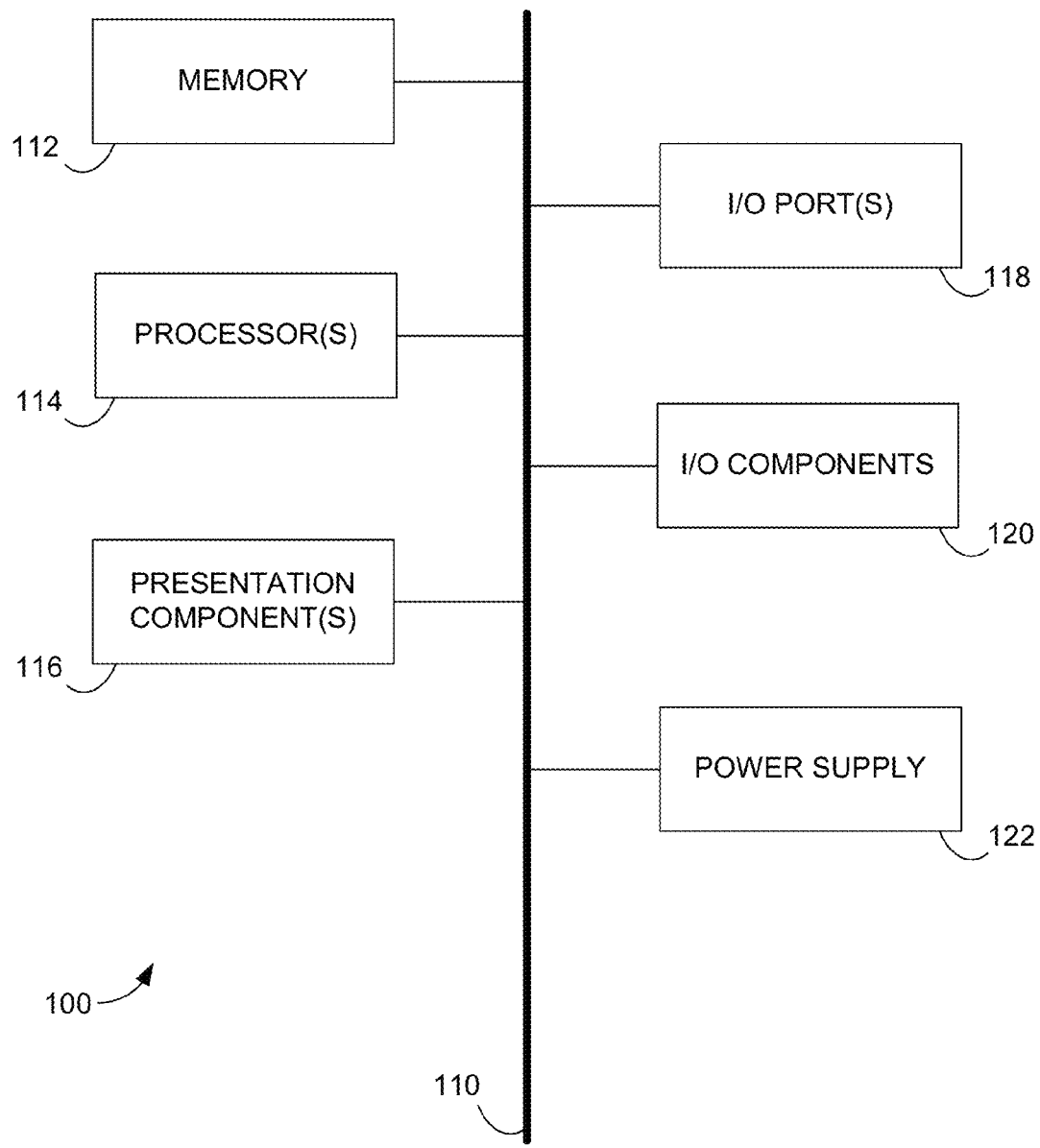
FIG. 1 is a block diagram of an exemplary computing environment suitable for implementing embodiments discussed herein.

The subject matter of embodiments of the present invention is described with specificity herein to meet statutory requirements. But the description itself is not intended to necessarily limit the scope of claims. Rather, the claimed subject matter might be embodied in other ways to include different steps or combinations of steps similar to the ones described in this document, in conjunction with other present or future technologies. Terms should not be interpreted as implying any particular order among or between various steps herein disclosed unless and except when the order of individual steps is explicitly described.

Some embodiments described herein generally relate to creating a digital representation of an object captured by a camera. In one embodiment, a user holds the object in front of the camera, the camera captures an image of the object, and a device digitizes the captured object into a 3D rendition that can be displayed digitally—for instance, as an entity in a video game. To illustrate, consider the following example. A user holds up a toy octopus to a gaming device equipped with a camera. Using the camera, the gaming device takes pictures of the front and back of the object, capturing both color and depth data for each side. Using the depth data, a 3D rendition of the octopus is constructed, and the color data is then added to the 3D rendition to create a digital rendition (referred to herein as a "digitization") of the octopus. The digitization can then be used in games or any other software or web application where display of the octopus is useful.

At least one embodiment is directed to using multiple images captured by disparate users to digitize an object. In one embodiment, the object is recognized in the image and digitized to create a virtual rendition of the object. One or more servers and/or databases are queried for three-dimensional models, or other virtual renditions, of the object generated from images taken by the other users. For example, one user may take a picture of a particular doll with a camera connected to a computing device. The computing device can then query a cloud service for other pictures of the doll or virtual renditions of the doll in the other pictures. These other pictures or virtual renditions may capture the object from different angles, from different sides, with more complex color and/or depth data, from varying distances (e.g., the image captures the image from two feet away, whereas some images capture the object from ten feet away), or otherwise capture the object in a different manner than the image. Using different points of view or virtual renditions of the object allows some embodiments to generate a more detailed rendition of the object because the other images or renditions provide additional detail not captured by the image.

Another embodiment is directed to generating a 3D rendition of an object in an image. Once the object is recognized in the image—using any number of image-recognition techniques—a database or server is queried for images containing the same object, or at least objects meeting the same classification. Images from the database or server are used to create 3D renditions of the objects from the other images, and the 3D renditions are merged with a 3D rendition of the object in the image to create a virtual rendition of the object. Using objects captured from other images allows one embodiment to build a 3D model of the object without a user having to laboriously capture numerous images, because the images previously captured by others are being used.

Before proceeding, a number of terms should be defined. A "virtual rendition" of an object refers to the stored virtual representation of the object in an image. Some cameras may capture both color and depth data in an image. Color data indicate the color of different points in the image—e.g., a bitmap representation of the RGB values for all pixels of an image. Depth data indicate distances of the different points from the camera or some other focal point—e.g., the distance of every point in the bitmap representation. Together, color and depth data accurately depict the color of every point or pixel of the image and the distance of each point from the camera or focal point.

A "three-dimensional model" of an object refers to the color and depth data of the image mapped in 3D space. In other words, points are mapped in three dimensions according based on the points' captured color and depth data. For example, suppose a person took a picture holding a doll 2 feet away from the camera, and the doll's purple nose was exactly 1½ feet from the camera's aperture while the doll's blue eyes were 1¾ feet from the aperture. Mapping the doll in 3D space would then result in points or pixels representing the purple nose lying ¼ inch further in one direction (x, y, or z) than points or pixels for the blue eyes. Embodiments are not limited to such a mapping technique, or to 3D mapping at all as some embodiments may simply store and color and depth data but not map points or pixels in 3D space.

A "classification" of an object refers to associating an identified object in an image with one or more keywords, phrases, images, objects, and/or other media. Thinking of the database structure that maps images or object in images in a tree-like structure such that higher nodes depict more generalized classifications while lower nodes depict more specialized classifications, a general classification may include a keyword (e.g., "ball") that branches into several different classifications ("baseball," "football," "basketball"). The different classifications may themselves contain underlying specific classifications, for example under "basketball," different manufactures of basketballs like "Nike," "Wilson," "Spalding," "Tachikara," etc. Under each manufacturer, more specific classifications may follow, such as each company's different basketball model. Classifications may become as specific or generalized as possible and may be split based on myriad criteria like date, time, geographic location, image or indicia recognition, user, group of users, or nearly any other type of classification.

Objects may have different "indicia" of significance. Colors, patterns, logos, trademarked symbols, or other markings or indications may be found on objects in images. The indicia may be useful in classifying the object and/or searching for the object in other images. For example, a Swoosh on a basketball may indicate the basketball is made by Nike. A trademark face or hat on a doll may indicate a doll of Buzz Lightyear from the popular Toy Story movies. The shape or red coloring of a bottle may indicate bottle of Coca-Cola. Examples of significant indicia abound, numbering far too many to be listed herein; however, it should be noted that different indicia may be recognized on objects and used in searching for similar objects in images taken by other users.

Different recognition techniques and algorithms may be used to identify and recognize an object in an image. Depth data can be used to determine objects that are farther away in an image than others. One embodiment locates objects in an image based on distance away from the camera capturing an image, assuming that objects closer to the camera are more important than those further away. Another embodiment compares color and/or contrast—either alone or in conjunction with disparities in corresponding depth data—of different pixels, points, or regions (i.e., for tile-based rendering) to determine where edges of objects are in an image. For example, image-recognition software can look at an image and determine the edges of a brown basketball being held up against a white jersey by noticing the where the brown ends and the white begins. The area that is brown, then, can be identified as the image while the area that is white may be identified as background.

Matching algorithms may also be used by servers or other computing devices when searching for an object in other users' images. In one embodiment, the matching algorithm uses an error threshold to determine whether the other users' images contain the object. For example, the matching algorithm may determine that an object in one image has 96% of the features, color, or depth disparity of the object in an image and that a 5% error threshold is acceptable. The matching algorithm, in such an example, may then choose to use the image to create a virtual rendition of the object. Error thresholds may also be used in deciding which images of objects to use, such as when 100 images of a particular basketball are found but only a choice few are within the specific error threshold. Those choice few can be selected for use in generating the virtual rendition of the object.

Another embodiment allows for a client computing device to directly query databases or servers for images, or virtual renditions of objects in images, that contain an object. Once the servers or databases return the images or virtual renditions objects, the client computing device can construct a virtual rendition of the object, instead of such construction being performed in the cloud.

Operatively speaking, a user presents the object to a camera on a computing device (such as a gaming console). The device may instruct the user to position the object for display to optimize captured images—e.g., by placing an outline on a screen reflecting the image being seen by the camera and indicating that the user should move the object into the outline. Eventually, the device captures an image, or images, of the object. The user may then be instructed to present the backside of the object to the camera for capturing. The device may then capture an image, or images, of the backside of the object. The captured front and back images are processed to construct a 3D digitization of the object.

In one embodiment, processing uses depth data of the images captured by the camera. Depth data describes the proximity of things captured in the images in a per-pixel or other spatial representation. Using the depth data, the closest point of an object in the image is located. This embodiment assumes that the closest object an image is the object the user is looking to capture—e.g., a user holding an octopus to camera would likely mean that the octopus is the closest thing to the camera.

Having briefly described in an overview of the present invention, an exemplary operating environment in which various aspects of the present invention may be implemented is now described. Referring to the drawings in general, and initially to FIG. 1 in particular, an exemplary operating environment for implementing embodiments of the present invention is shown and designated generally as computing device 100. Computing device 100 is but one example of a suitable computing environment and is not intended to suggest any limitation as to the scope of use or functionality of the invention. Neither should the computing device 100 be interpreted as having any dependency or requirement relating to any one or combination of components illustrated.

Embodiments of the invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. Embodiments of the invention may be practiced in a variety of system configurations, including hand-held devices, consumer electronics, general-purpose computers, more specialty computing devices, and the like. Embodiments of the invention may also be practiced in distributed computing environments where tasks may be performed by remote-processing devices that may be linked through a communications network.

With continued reference to FIG. 1, computing device 100 includes a bus 101 that directly or indirectly couples the following devices: memory 102, one or more processors 103, one or more presentation components 104, input/output (I/O) ports 105, I/O components 106, and an illustrative power supply 107. Bus 101 represents what may be one or more busses (such as an address bus, data bus, or combination thereof). Although the various blocks of FIG. 1 are shown with lines for the sake of clarity, in reality, delineating various components is not so clear, and metaphorically, the lines would more accurately be grey and fuzzy. For example, one may consider a presentation component such as a display device to be an I/O component. Additionally, many processors have memory. The inventors hereof recognize that such is the nature of the art, and reiterates that the diagram of FIG. 1 is merely illustrative of an exemplary computing device that can be used in connection with one or more embodiments of the present invention. Distinction is not made between such categories as "workstation," "server," "laptop," "gaming console," "hand-held device," etc., as all are contemplated within the scope of FIG. 1 and reference to "computing device."

Computing device 100 typically includes a variety of computer-readable media. Computer-readable media can be any available media that can be accessed by computing device 100 and includes both volatile and nonvolatile media, removable and non-removable media. By way of example, and not limitation, computer-readable media may comprise computer-storage media and communication media. Computer-storage media includes volatile and nonvolatile, removable and non-removable media implemented in any method or technology for storage of information such as computer-readable instructions, data structures, program modules or other data. Computer-storage media includes, but is not limited to, Random Access Memory (RAM), Read Only Memory (ROM), Electronically Erasable Programmable Read Only Memory (EEPROM), flash memory or other memory technology, CD-ROM, digital versatile disks (DVD) or other holographic memory, magnetic cassettes, magnetic tape, magnetic disk storage or other magnetic storage devices, or any other medium that can be used to encode desired information and which can be accessed by the computing device 100.

The memory 102 includes computer-storage media in the form of volatile and/or nonvolatile memory. The memory 102 may be removable, non-removable, or a combination thereof. Exemplary hardware devices include solid-state memory, hard drives, optical-disc drives, etc. The computing device 100 includes one or more processors that read data from various entities such as the memory 102 or the I/O components 106. The presentation component(s) 104 present data indications to a user or other device. Exemplary presentation components include a display device, speaker, printing component, vibrating component, and the like.

The I/O components 106 may comprise a camera capable of taking static pictures or video. In one embodiment, the camera, when taking a picture, color data (e.g., red, green, blue) and depth data. Depth data indicates the proximity—in one embodiment, on a per-pixel basis—of objects being captured by the camera to the camera itself. Depth data may be captured in a number of ways, like using an infrared (IR) camera to read projected IR light, reading projected laser light, or the like. Depth data may be stored in a per-centimeter, per-meter, or other spatial representation. For example, IR dots may be projected and read by an IR camera, producing an output file that details the depth of an image in an area directly in front of the camera, measured in a per-meter orientation. Additionally, depth data may also indicate the orientation of a particular part of a captured object by recording the pixels of screen area where depth is measured. Because the color camera and the depth camera may be located separately from one another, conversions may be made to map retrieved color data to corresponding depth data.

The I/O ports 105 allow the computing device 100 to be logically coupled to other devices including the I/O components 106, some of which may be built in. Illustrative I/O components 106 include a microphone, joystick, game pad, satellite dish, scanner, printer, wireless device, and the like.

Figure 2:
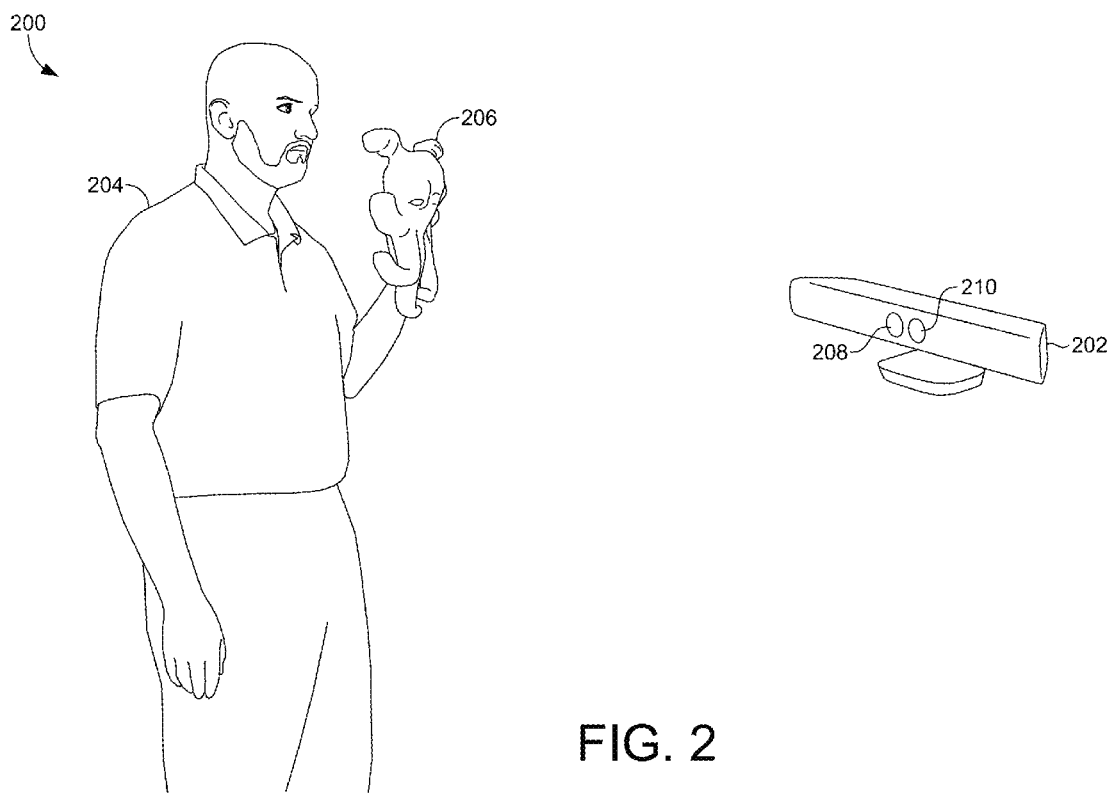
FIG. 2 is a diagram of a user presenting an object for digitization, according to one embodiment.

FIG. 2 is a diagram of an environment 200 for a user 204 to create a digital representation of an object 206, according to one embodiment. Specifically, environment 200 shows user 204 presenting the object 206, illustrated as octopus figurine, to a computing device 202, which is equipped with two cameras: color camera 208 and depth camera 210. In environment 200, computing device 202 is a game console, such as the Microsoft Kinect™ created by the Microsoft Corporation®. The cameras on computing device 202 capture one or more images that include the object 206. Color camera 208 captures color data for images, and depth camera 210 captures depth data. In alternative embodiments, computing device 202 may only have one camera that captures both color and depth data.

While not shown, user 204 may present the backside of the object 206 to the computing device to get capture an image of the backside that can be combined with a front side image and used to produce a 3D rendition of object 206. Additional images of other views of the object may also be captured in order to generate a more complete 3D digitization.

Figure 3:
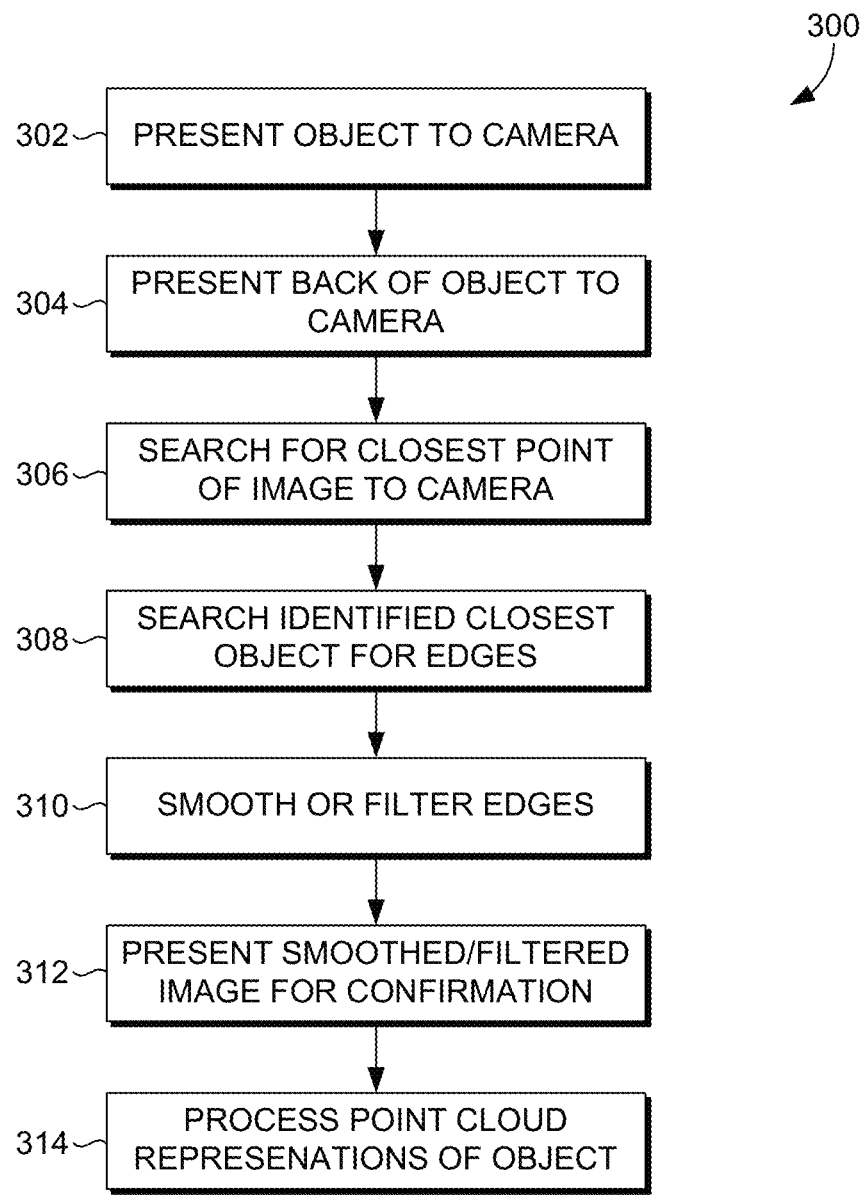
FIG. 3 is a diagram of a work flow for digitizing an object, according to one embodiment.

FIG. 3 is a diagram of a work flow 300 for digitizing an object, according to one embodiment. Initially, a user presents the object to a camera on a computing device to images taken, as shown at 302. The computing device may, in some embodiments, instruct the user to move the object into a specific area in order to capture an optimal image of the image—for example, asking providing an outline on a display, showing a real-time image of the user and the object, and then instructing the user to move the object into the outline. Once an initial image is taken, the computing device may instruct the user to present the backside of the object for capturing, as shown at 304. Guidance for capturing the backside may similarly be provided by the computing device. For each image captured, color and depth data are stored and used to digitize the object being presented. Moreover, multiple images may be captured for the front and backside perspectives of the object. For example, the computing device may be configured to take ten front images and ten back images, and possibly merge the front ten together and the back ten together—or use all twenty to digitize the image. While ten images have shown to be an ideal number of images to digitize an object, other embodiments may use different numbers of captured images.

Once front and back images of the object are captured by the camera, one embodiment begins digitizing the object by searching—using depth data of the images—for the closest point in the image to the camera, as shown at 306. The user is probably holding the object to be digitized in front of the user, so it the object should be closer to the camera than anything else. Turning back to FIG. 2 for a second, one may notice that user 204 is holding the object 206 in front of him and thus closer to the computing device 202. Locating the closest object in the image may be accomplished using the depth data associated with the image, and some embodiments perform the process on both front and backside images to identify the closest object in both.

As indicated at 308, the closest objects identified in the images are then searched for edges to identify where the objects end. Depth data is again used to locate the edges of objects in the image. Edge searching may commence outwardly from the closest point, looking for drastic differences in the depths of points. For example, the edge of the octopus in FIG. 2 may have a point that is nearly half a meter closer than an adjacent point representing user 204's shoulder. Such a drastic difference represents a readable signal that the adjacent point is not part of the object and thus should not be included in further digitization steps. Locating all the edges of an object in such a manner allows the computing device to identify the object in the image.

Once the object is determined, one embodiment switches off the color data associated with the rest of the image (i.e., the portion of the image not identified as the object). It may be necessary in some embodiments to capture multiple images (e.g., ten images of the front and ten of the back of the object), so a smoothing technique may be required to blend the found edges between frames, as shown at 310. For example, the object may have moved between frame one and frame four so smoothing the edges between the frames may be necessary to get an accurate representation of the object. Additionally, noise, low resolution, and imperfections in depth-to-color registration may also necessitate additional smoothing and/or filtering of the edges.

In one embodiment, the resultant smoothed and/or filtered object is presented to the user for confirmation, as shown at 312. The user can then accept or reject the resultant object. If accepted, additional processing may then proceed to digitize the object. If rejected, embodiments may ask the user to begin the process over by taking new pictures of the object, or may simply re-smooth or re-filter the object.

Figure 11:
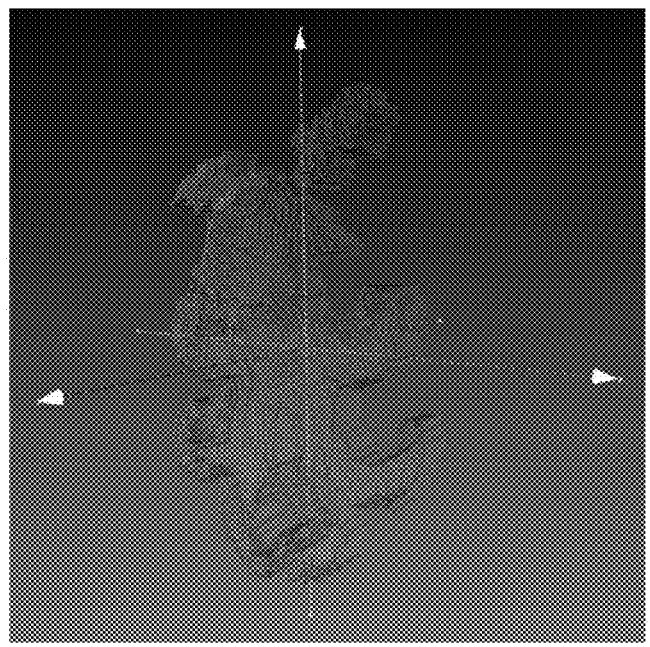
FIG. 11 is a diagram of a three-dimensional (3D) point cloud construction of an object, according to one embodiment.

Eventually, the front and back images are used to generate a point cloud construction of the object in 3D. A "point cloud construction," shown in detail in FIG. 11 is a mapping of the front and/or back images of the object into 3D space, with the depth of each point or pixel of the object identified. The point cloud construction is used in further digitization of the object.

Figure 4A:
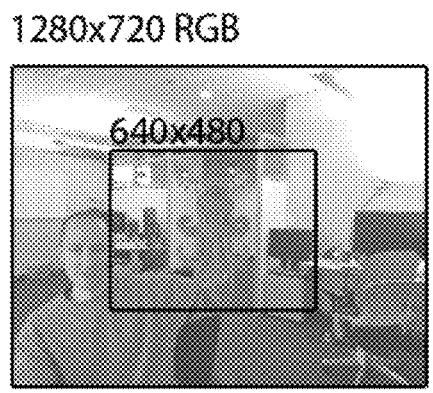
FIGS. 4A and 4B are diagrams of camera-view perspectives of a user presenting an object for digitization, according to one embodiment.
Figure 4B:
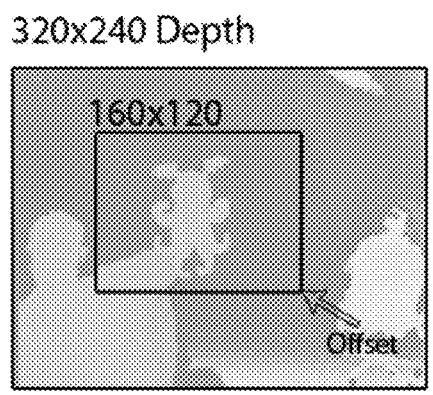

FIGS. 4-26 show images of various steps in the digitization process and will be discussed in further detail below to illustrate the processing used by different embodiments. Specifically, FIGS. 4A and 4B are diagrams of camera-view perspectives of a user presenting an object for digitization, according to one embodiment. In the illustrated embodiment, two views of the object are captured. The color camera is zoomed in on the center of the frame to get a 640×480 color window around the target object, and the corners of the color window are then transformed into depth frame coordinates (assuming the corners are at the front of the target object). A matching 160×120 window is then grabbed from the depth frame. Without this per-frame window adjustment (dependent on the distance of the target object to the camera), the depth and color windows may not overlap as fully as possible. Moreover, raw color and depth are captured without performing depth-to-color or color-to-depth registration. The resolution numbers and windows are merely provided for illustrative purposes, as various other resolutions may alternatively be used.

Figure 5:
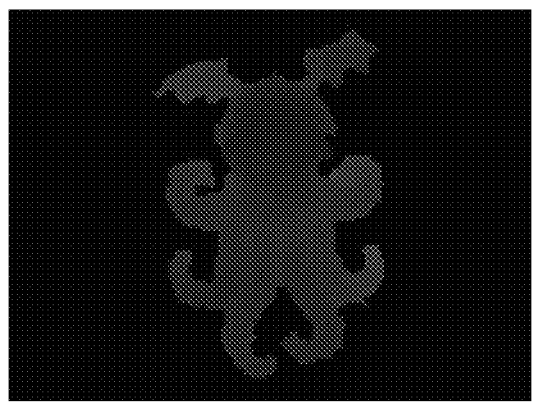
FIG. 5 is a diagram of a segmented depth image usable to digitize an object, according to one embodiment.

In one embodiment, the depth image is segmented to the target object. To do so, the closest depth pixel to the camera is searched for and found, assuming that such a point is on the target object. This embodiment then flood-fills outwardly from found closest point until depth edges (i.e., where depth is too far from the front of the object or we have no depth data) are hit. Additionally, points around high slope areas and with too few neighbors may be removed. The result is a mask of depth pixels that are on the target object (referred to herein as a "segmented depth image"), as shown in FIG. 5. The segmented depth image is stored in a ring buffer of depth frames (BAB/GOE shipped with a ring buffer size of 10), overwriting the oldest depth frame and averaging all frames together to get a final depth image. In one embodiment, only segmented depth pixels contribute to the final average. As a result, noise is smoothed, resulting in a more stable object edge and improving scenarios where parts of the object are blinking in and out of the segmentation due to noise or poor IR reflecting materials.

Figure 6:
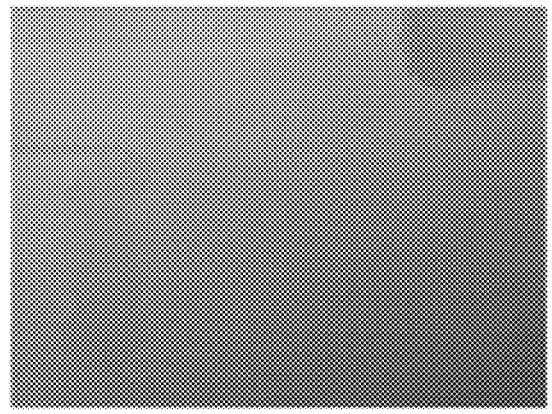
FIG. 6 is a diagram of depth-to-color offsets, according to one embodiment

FIG. 6 is a diagram of depth-to-color offsets, according to one embodiment. As illustrated, one embodiment builds a depth-to-color offset table with the green colors (shown in the uppermost, right corner) representing green points, red colors (shown in the lower left corner), and blending of the two in between. The offsets between each pixel's depth and color space coordinates are stored in a table for rapid lookup during color segmentation and mesh processing, as well as to aid perfectly reproducing output meshes using only the two captured color images, regardless of the calibration settings of a particular camera. Regions of the table outside the object segmentation may be filled in by copying offsets at the edge of the segmentation outwards. The copied offset at the edge may be used later to handle cases when vertices in the output mesh projected into the depth image fall outside the bounds of the depth segmentation.

Figure 7:
FIG. 7 is a diagram of a source color image usable to digitize an object, according to one embodiment.
Figure 8:
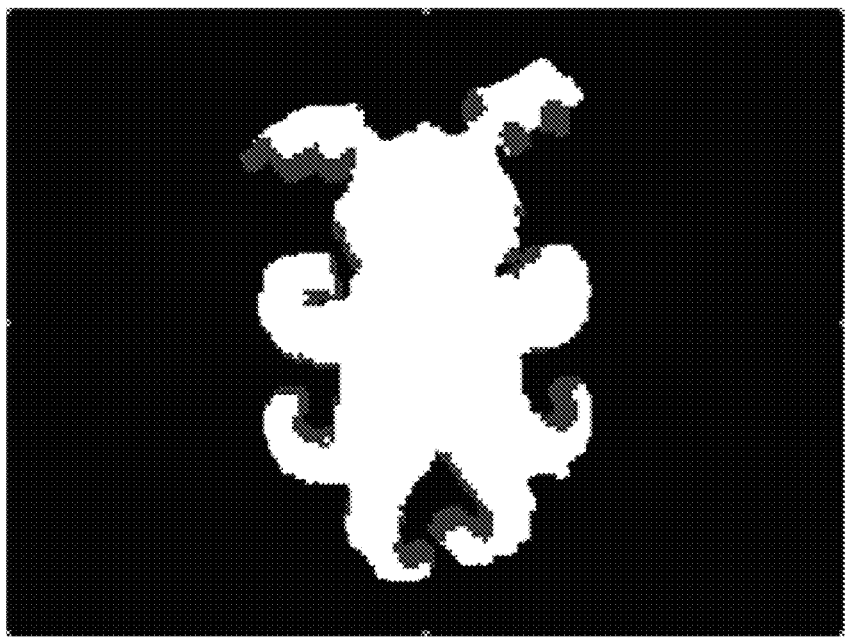
FIG. 8 is a diagram of a color segmentation of a captured object, according to one embodiment.

FIG. 7 is a diagram of a source color image, and FIG. 8 is a diagram of a color segmentation of a captured object, according to one embodiment. Starting with the segmentation in depth space, one embodiment splats each segmented depth pixel into a 320×240 color segmentation buffer, using a star-like splat pattern. The resultant pattern may then be "upsampled" to 640×480, and a "distance-from-ideal" value, which describes how far the source depth pixel is from the "ideal" distance, is then computed for each segmented color pixel. The ideal distance represents how close to the camera the user should hold the target object in order to get as much color/depth data as possible—without intersecting the front clip plane of the depth camera. These values may be presented as feedback to the user during the capture process. Pixels further from ideal may be blurred and tinted more heavily than pixels closer to ideal. The distance-from-ideal values are eventually copied into the alpha channel of the color image used for real-time previewing.

Figure 9:
FIGS. 9 and 10 are diagrams of user interfaces (UIs) giving guidance for holding objects to be digitized, according to one embodiment.
Figure 10:
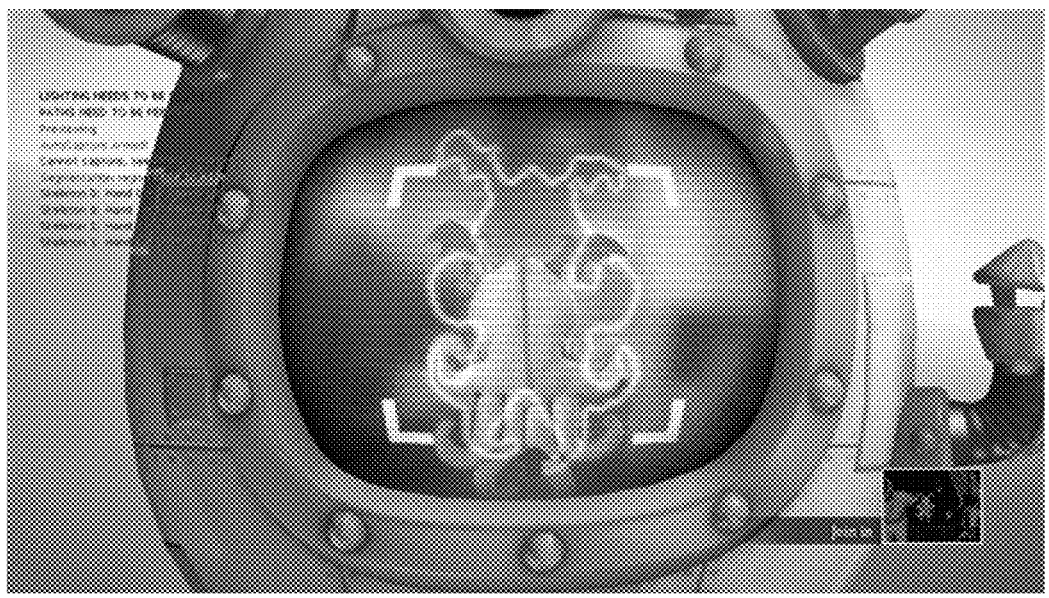

FIGS. 9 and 10 are diagrams of user interfaces (UIs) giving guidance for holding objects to be digitized, according to one embodiment. FIG. 9 shows that the illustrated embodiment analyzes the number of segmented pixels, distance to the camera, distance from the center of the camera view, pixel stability, and object size, and gives the user visual and text feedback on how to best position the object. The feedback may be in the form of an outline on a screen. FIG. 10 shows color and depth data of an image of the back of the target object, using the same process as above. One embodiment guides the user to orient the object correctly using the outline of the segmented front capture. The user may not have to match the outline precisely because front and back captures may later be aligned automatically.

FIG. 11 shows a point cloud construction, according to one embodiment. At this point two color and depth data images have been segmented to the target object. Using these images, a point cloud construction of points on the surface of the target object can be built and later used to reconstruct a triangle mesh. Segmented pixels in the front depth image are transformed into a "sheet" of 3D points. In one embodiment, positions are un-projected from depth image space into model space using depth data and the origin being the back-center of the sheet. The edges of the sheet are extruded backwards by adding additional points to form the sides of the object. To guess how "deep" the object is, in BAB/GOE, a fixed value for the extrude distance is used.

Figures 12A, 12B:
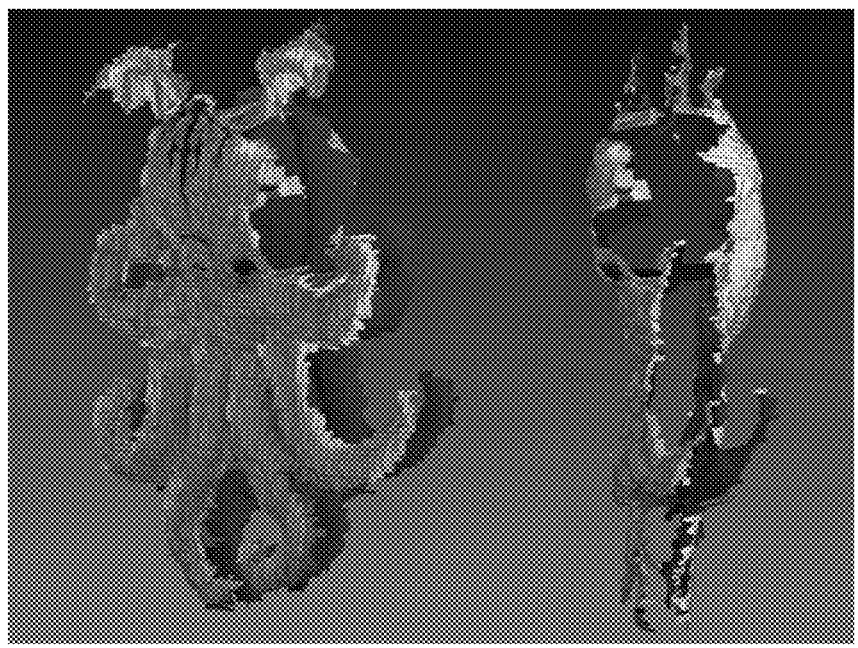
FIG. 12 is a diagram of two views of aligned point sheets, according to one embodiment.

Similarly, a sheet of 3D points from the back depth image is created, using the back-center of the front capture as the origin. FIG. 12 illustrates two views of aligned point sheets, according to one embodiment. To align the sheets, an initial transform is calculated to rotate the sheet 180 degrees around the up axis so that it forms the back of the point cloud. In one embodiment, another transform is calculated that aligns the edges of the front and back sheets as closely as possible. The alignment process may translate the back sheet to match the center of mass of the back sheet with center of mass of the front sheet. A brute-force iterate is then used over a range of translations and rotations to minimize an "alignment error" value, computed as the sum of the distances from each front edge point to its closest back edge point. The iterate may be done in multiple passes (with each pass attempting to compute the best value for each translation and rotation axis one at a time), and the search across each axis is done using a two-tier hierarchical approach for efficiency. Closest-point-finding is accelerated using a 3D cell space partition. One embodiment also implements an iterative closest point ("ICP") algorithm for fast fine-grained alignment, or alternatively, the need for better control may dictate use of only the brute-force method iterative.

Points from the front sheet that do not have corresponding points in the back sheet may be culled to search backwards from each front point to find the nearest back point. Likewise, points from the back sheet that do not have corresponding points in the front sheet may be culled. This removes parts of the sheet that are inconsistent between the front and back captures, as can happen if the user's hand is in the capture but has changed position between captures, or if the object has changed shape between front and back captures.

Figure 13:
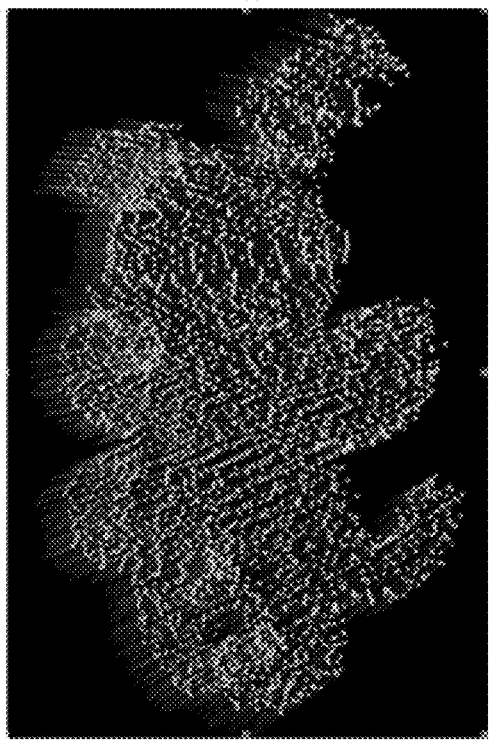
FIG. 13 is a diagram of a final point cloud construction, according to one embodiment.

In one embodiment, the remaining points are merged together into a final point cloud, and the normals for the points are computed using the plane formed by each point and its right and lower neighbors. FIG. 13 shows a final point cloud construction, according to one embodiment.

Figure 14:
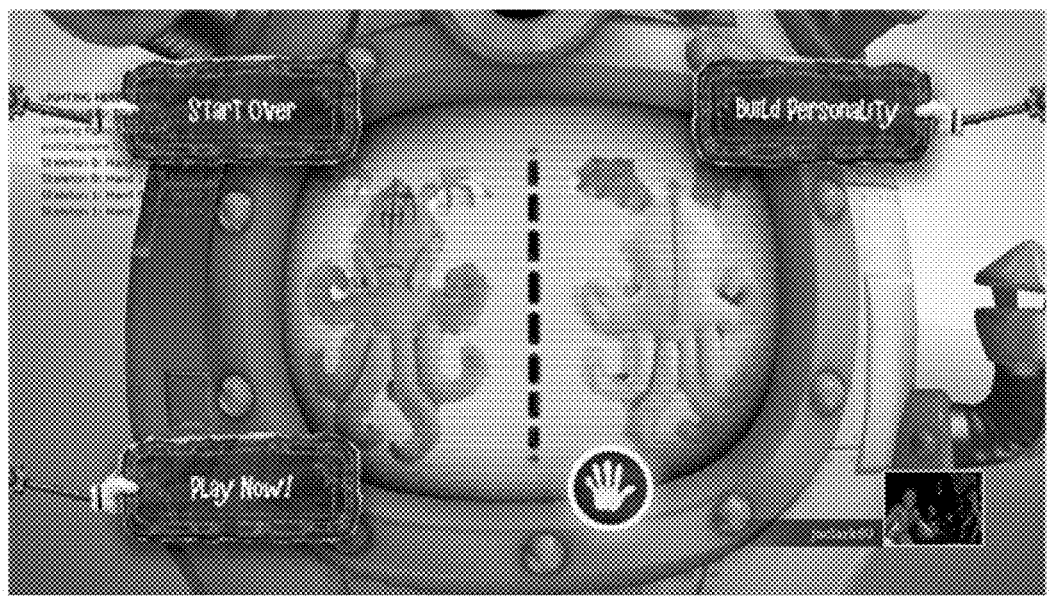
FIG. 14 is a diagram of a UI displaying a confirmation image of a digitized object displayed to a user, according to one embodiment.

A confirmation image may then be presented to the user, as shown in FIG. 14. The confirmation image incorporate the results of sheet alignment and point culling, allowing the user to detect cases when capture, alignment, or culling have failed badly and to re-capture without having to go through the remainder of the construction process. The image is created by projecting and splatting points in the final point cloud into the alpha channel of the front and back color images, rotating the back image based on the alignment transform, and doing some additional image cleanup.

Figure 15:
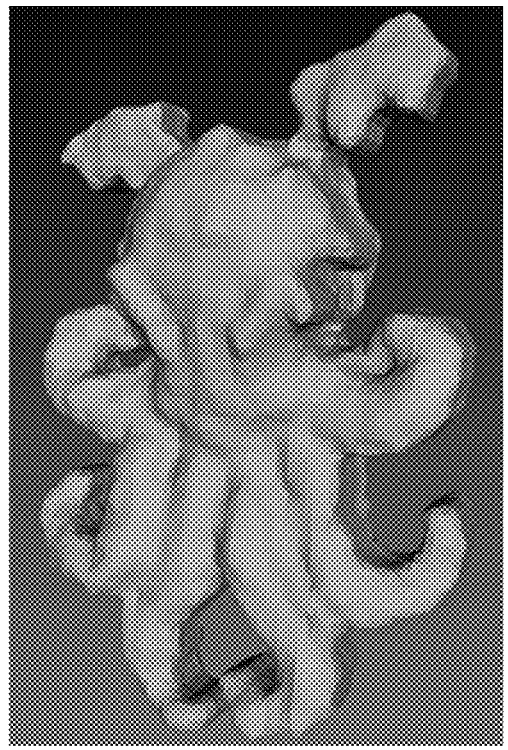
FIG. 15 is a diagram of a mesh output of a captured image, according to one embodiment.

A surface reconstruction step takes the final point cloud and generates a triangle mesh. FIG. 15 illustrates a diagram of a mesh output with surface reconstruction. One embodiment uses a hybrid CPU/GPU implementation of the Poisson Surface Reconstruction algorithm detailed in "Poisson Surface Reconstruction," by Kazhdan, Bolitho, and Hoppe; and "Highly Parallel Surface Reconstruction" by Zhou, Gong, Huang, and Guo. This may be the most computationally intense part of digitization in both memory and time, taking, in some embodiments, 10-20 seconds for a typical point cloud data of approximately 20,000 points. The amount of hole-filling may be limited during reconstruction to keep memory usage under control, but such limiting can result in non-water-tight meshes if there are large holes in the point cloud.

Figure 16:
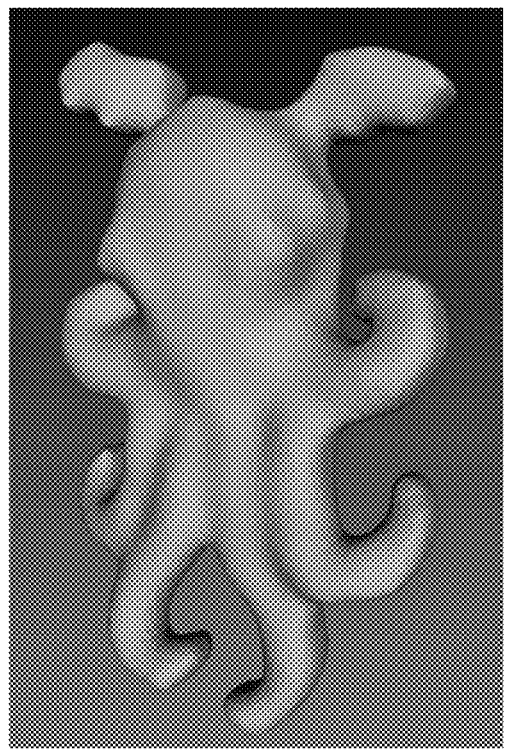
FIG. 16 is a diagram of a smoothed and processed image of an object, according to one embodiment.

FIG. 16 is a diagram of a smoothed and processed image of an object, according to one embodiment. Vertex adjacency lists are built and face and vertex normals are computed. Then, one embodiment uses a Laplacian algorithm to smooth some constraints. As a result, the sides of the object are rounded off, noise removed, and areas where the point sheets do not line up perfectly are cleaned up.

Depending on the quality of the point cloud, the surface reconstruction can create small "islands" of geometry instead of a single large mesh. One embodiment uses connected component labeling to find islands, compute their volumes, and remove islands that are significantly smaller than the largest island.

For each vertex, one embodiment looks at the dot product between that vertex's normal and the front and back capture view directions. The front view direction may be along the model-space negative Z axis, while the back view direction may depend on the results of the sheet alignment process and not along the positive Z axis. As a result, some vertices may be visible to both the front and back capture views, and some vertices may be visible to neither view. Some vertices may be classified as "front" if their normal is facing the front more than the back and vice versa. This also allows for location of the "seam" vertices (i.e. the vertices that straddle the front and back views of the object).

To create the texture map to apply onto the final mesh, one embodiment places a color image from the front capture at the top of the texture and the color image from the back capture directly under the front capture. Texels from the top part of the texture are then mapped onto the primarily front-facing triangles and vice versa for the primarily back-facing triangles. Vertices may initially be shared between front and back triangles right along the front-back seam, and later, these shared vertices may be duplicated so that to map different parts of the texture to front versus back triangles.

Figure 17:
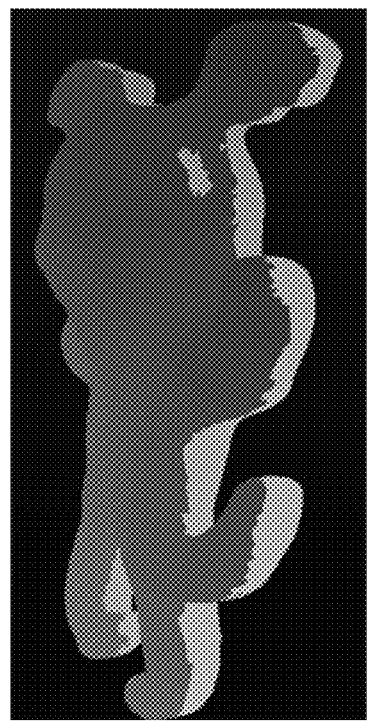
FIG. 17 is a diagram of an image with UV coordinates, according to one embodiment.
Figure 18:
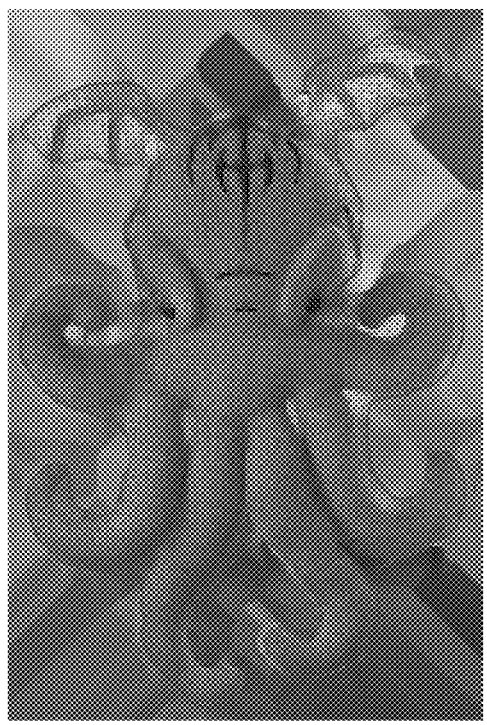
FIG. 18 is a diagram of front-facing triangle edges drawn into a section of a final texture map, according to one embodiment.

FIG. 17 illustrates a diagram of an image with UV coordinates, and FIG. 18 illustrates a diagram of front-facing triangle edges drawn into a section of a final texture map, according to one embodiment. To compute UV coordinate, front-facing triangles are mapped to the top part of the texture where placed the front capture color image is placed, and likewise for the bottom. Vertex positions are in the space of the depth camera; whereas, the color images are in the space of the color camera, so after projecting vertices onto the front/back depth images, one embodiment uses the depth-to-color offset table to transform coordinates into the color camera space.

In one embodiment, the mesh is re-centered, mirrored about the up axis, and scaled to enforce a maximum width/height aspect ratio. The captured color and depth images are mirrored compared to the real physical object, so another mirroring is used to reverse this. A skeleton may be optimized and animations may be added for taller rather than wider objects, so the width/height aspect ratio restriction puts a bound on artifacts caused by animating wide objects that do not match a certain skeleton.

In one embodiment, a single skeleton is used for all animations the skeleton. The skeleton may have bones to give a good range of motions (walking, jumping, crawling, dancing, looking left and right, etc.) without requiring the target object to have much more shape.

To apply skin to the digitized image, the mesh is rescaled and positioned such that skeleton fits inside of it, with the top bone positioned a certain percentage (e.g., approximately 90%) from the top of the object (placing it roughly inside the "head" of the object) and the bottom bone at the bottom extent of the object. Bone indices can then be computed and weights added to the skeleton by finding the closest bones along the up axis to each vertex and weighting to them using a falloff curve. FIGS. 19A-19E are diagrams illustrating weighting added to the different bones of a generated skeletal structure, according to one embodiment.

Color and/or depth images are processed to reduce noise and improve quality. Processing is done on the front and back images independently, in one embodiment, and the results are merged into a final texture map, which may require additional processing. After some experimentation and feedback from artists, the following steps were found to be optimal: convert sRGB colors to linear space, apply "grey world" auto-white balance, repair edge artifacts, compute luma and chroma values, apply bilateral filtering, histogram equalization, and sharpening to luma, apply median filtering to chroma, convert back to sRGB, and finally, extend the edges of the colors outwards into the de-segmented regions of the image. Other steps may be added and some of the above deleted in different embodiments.

FIGS. 20A and 20B show images before and after luma/chroma processing, according to one embodiment. Processing luma/chroma independently allows for filtering chroma much more strongly while preserving details in the luma image, which is good for de-noising the image. Histogram equalization may be applied very lightly to compensate for poorly exposed images.

FIGS. 21A and 21B show source and output images after edges are filtered, according to one embodiment. In one embodiment, an "edge repair filter" attempts to replace colors at the edges of the target object that are actually from the background and not the object itself. Bad colors may creep in due to the relatively low resolution and high noise of the depth image and imperfect depth-to-color registration. The edge repair filter operates on a "disputed region" of pixels directly around the object edge. Using the assumption that pixels interior to the disputed region are definitely part of the target object and pixels further exterior are part of the background, a "background likelihood" value is computed per disputed region pixel and used to blend high-likelihood-background pixels towards interior colors.

FIGS. 22A and 22B show images where the edge repair filter finds background colors and which and target colors, according to one embodiment. The target colors are extrapolated into a disputed region from the outside.

Figure 24:
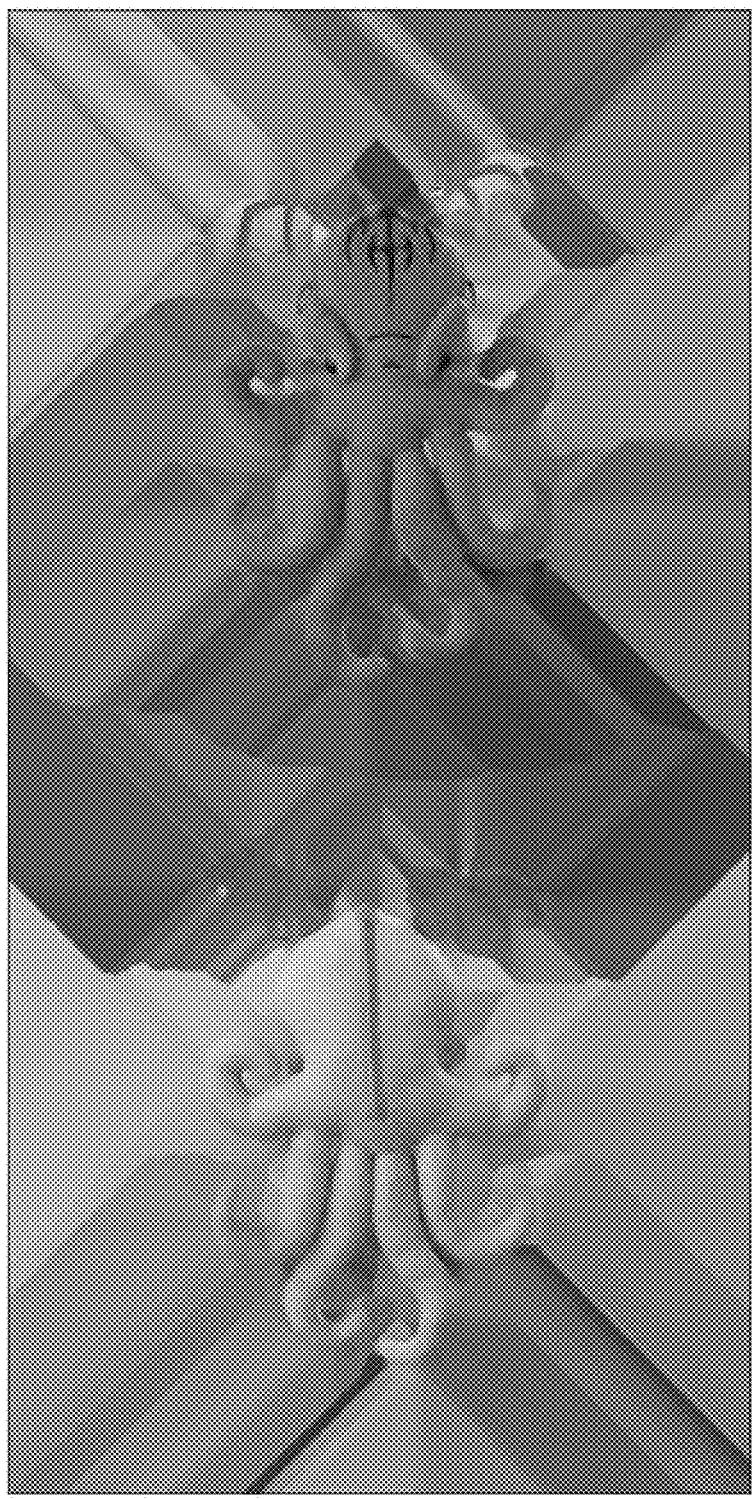
FIG. 24 is a diagram of a final composite texture map, according to one embodiment.

FIGS. 23A and 23B are images showing distance from an edge to a disputed region and calculated background likelihood values, according to one embodiment. Furthermore, FIG. 24 shows a final composite texture map of the image with texturing over tope of a non-finalized image, according to one embodiment.

Seams resulting from placing front and back images together may need to be repaired. The last bit of mesh processing is used to improve the appearance of the object near the front-back seam and in regions that were invisible to the color camera during capturing. First, a mask value per vertex is computed that represents how "bad" the texture color will be at that vertex. This value is the product of distance to the seam (where the front and back images touch but do not generally line up well) and how back-facing a vertex is to any of the captured images (where texture colors break down due to the surface facing away from the camera views and also from poor texel density). These values may be stored in a vertex color alpha channel. Next, a blurred version of the surface color is computed and stored into the vertex color RGB channels. These colors are fairly good in quality (although low in detail). The negative artifacts needing repair are relatively localized and of a higher frequency, where-as the blurring gives more global, low-frequency colors.

Figures 25A, 25B:
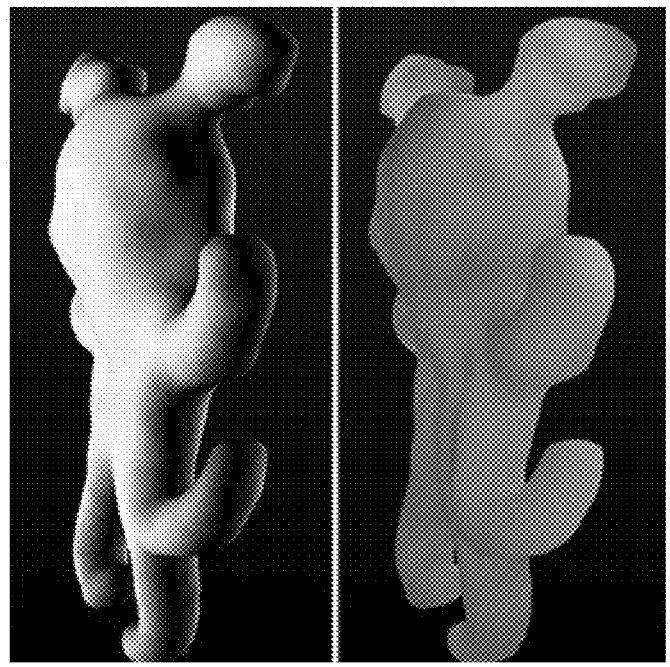
FIGS. 25A and 25B is a diagram of masked values and heavily blurred vertex colors, according to one embodiment.
Figures 26A, 26B:
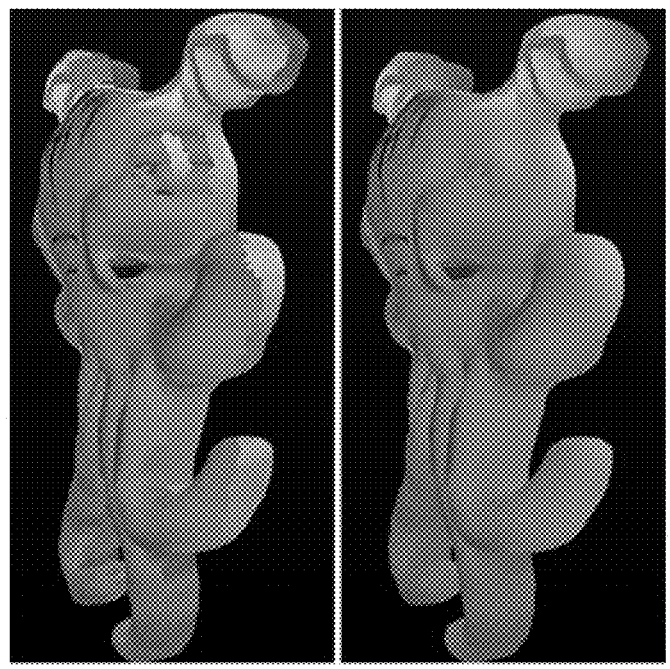
FIGS. 26A and 26B is a diagram of different meshes with texture only and texture with vertex color blending by mask value, according to one embodiment.
Figure 27:
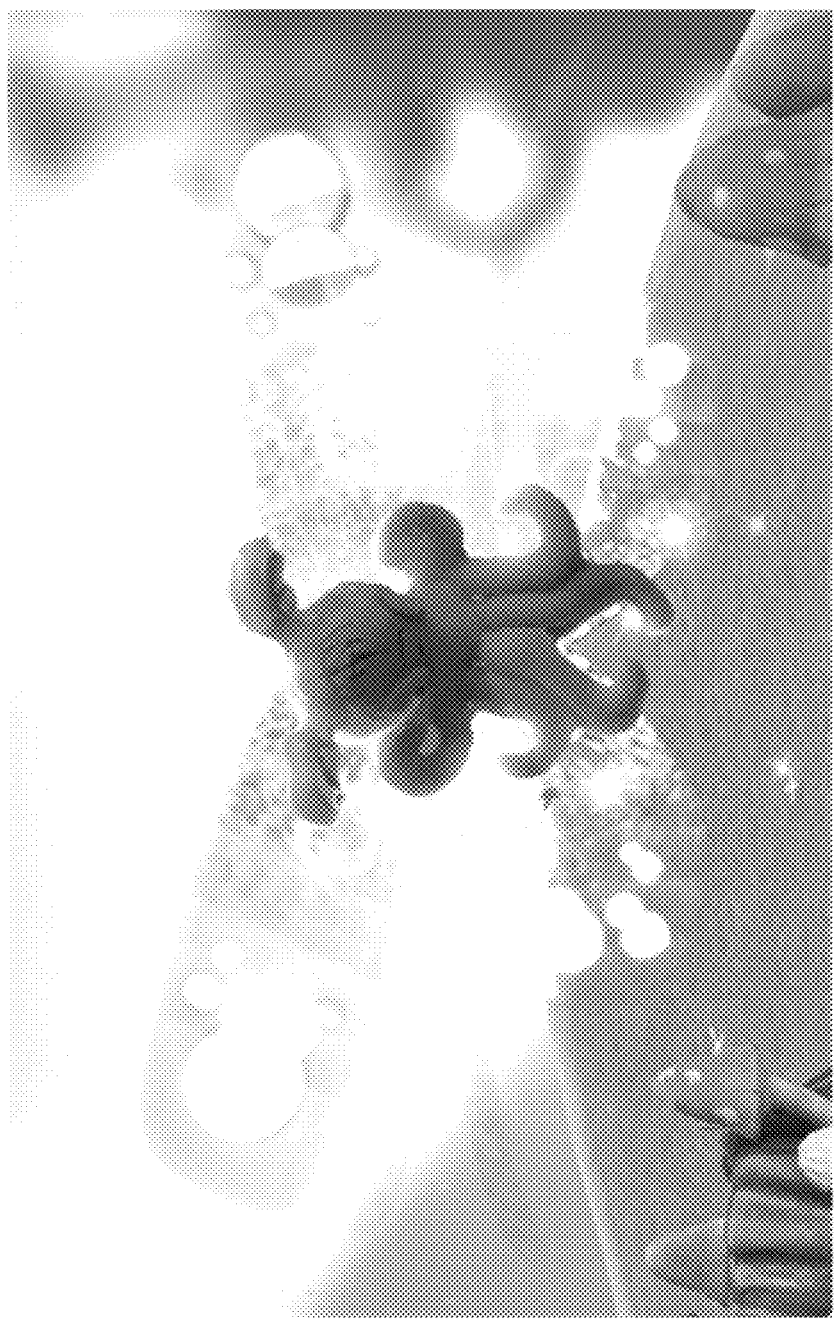
FIG. 27 is a diagram of a final rendering of the digitized object, according to one embodiment.

FIGS. 25A and 25B show masked values and heavily blurred vertex colors, according to one embodiment. At runtime, mask value is used to blend between the source texture and the blurred vertex color, in one embodiment. FIGS. 26A and 26B show different meshes with texture only (26A) and texture with vertex color blending by mask value (26B), according to one embodiment. FIG. 27 shows a final rendering of the digitized object, according to one embodiment. In one embodiment, once the final mesh and texture are complete, an Unreal Engine 3 mesh is created and rendered with environment and rim lighting, self-shadowing, and animation. The GOE app also allows the user to avateer the object by mapping the natural user interface (nUI) skin onto a skeleton.

The above steps balance usability, CPU/GPU/memory constraints, output quality, artistic concerns, sensor accuracy, and development time. As such, different steps could be added or some of the above deleted to improve the speed or quality of the final digitization.

Figure 28:
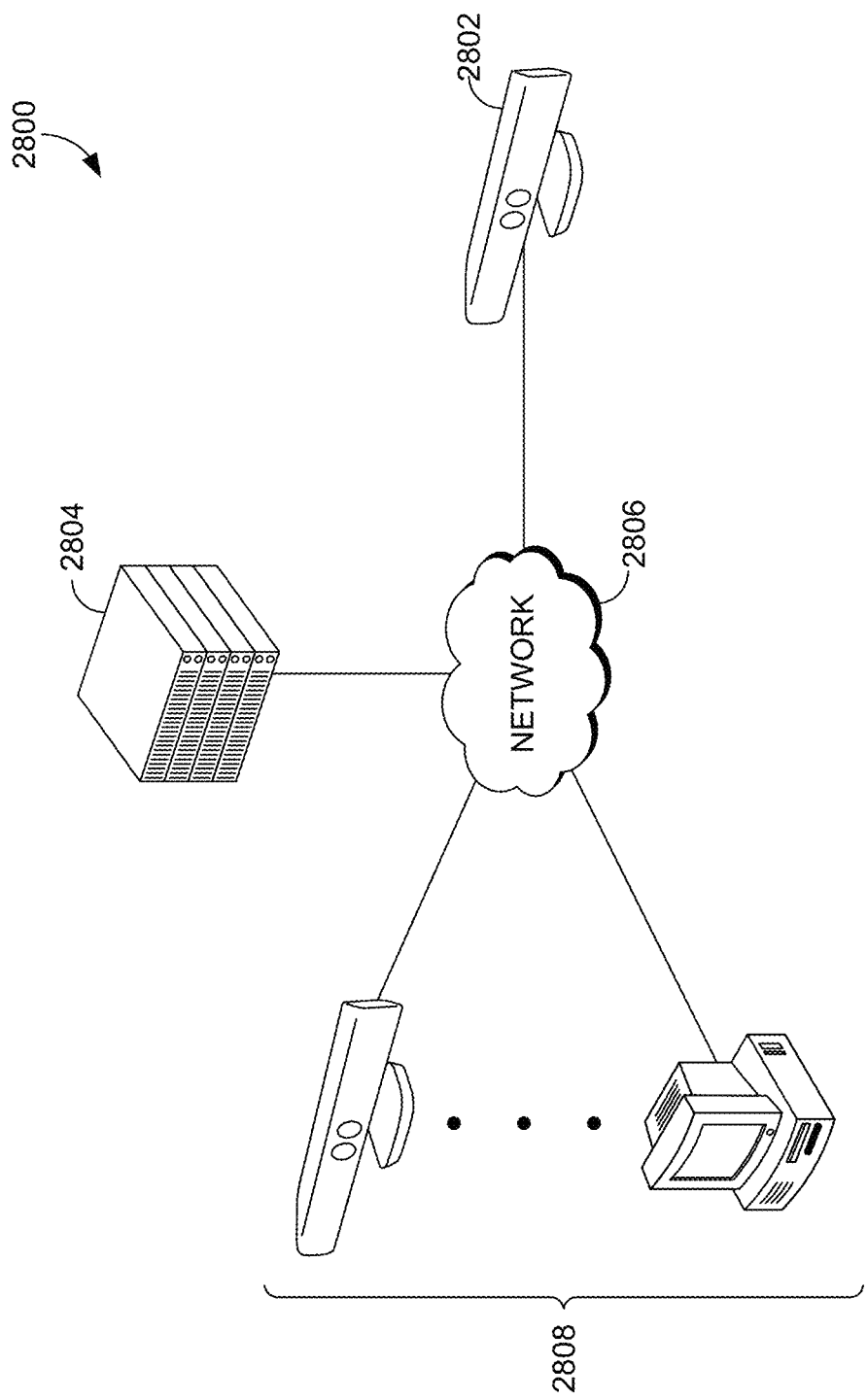
FIG. 28 is a diagram of a networked environment, according to one embodiment.

FIG. 28 is a diagram of a networked environment, according to one embodiment. Camera 2802, devices 2808, and server 2804 communicate over network 2806. Network 2806 may comprise a public or private network, for example the Internet, a private network, local area network (LAN), wide area network (WAN), or the like. When network 2806 comprises a LAN networking environment, components may be connected to the LAN through a network interface or adapter. When network 2806 comprises a WAN networking environment, components may use a modem to establish communications over the WAN. Network 2806 is not limited, however, to connections coupling separate computer units. In fact, network 2806 may also include subsystems that transfer data between a server and the computing devices. For example, the network 2806 may include a point-to-point connection. Computer networks are well known to one skilled in the art, and therefore do not need to be discussed at length herein.

Camera 2802 allows a user to take pictures of an object, capturing color and depth data for the image in one embodiment. While not shown, camera 2802 may be connected to a computing device (e.g., PC, laptop, tablet, mobile phone, game console, etc.) to perform any of the aforementioned image-recognition techniques to identify an object in the image. The connected computing device may also query and interact with server 2804 to locate images with similar objects, or 3D renditions of similar objects, uploaded to server 2804 by other users. The other users may use various devices 2808 (shown as a camera and PC, but may alternatively include any device mentioned with reference to FIG. 1 as well as gaming consoles or tablets) to capture and transmit images of various objects to server 2804.

Devices 2808 may be any type of computing device, such as the device 100 described above with reference to FIG. 1, a gaming console, a camera, a PC, a laptop, a mobile phone, or a combination thereof. In operation, devices 2808 provide users the ability to capture images of particular objects to be used by others for digitization of the objects. For example, suppose the makers of a computer-animated movie want to help people digitize the central character of the movie for different gaming or other reasons—e.g., to have Buzz Lightyear be a person's avatar in a game. The makers of Toy Story could take pictures of models of the central character, tag the images or portion of the images with the character with the character's name, and then upload the pictures to server 2804. Server 2804 may create a 3D rendition or point-cloud mapping of the character based on the image's color and depth data. The makers could also capture and upload numerous pictures of the object from various angles, sides, lighting, or other different set-up of the character, and the resultant renditions and point-cloud mappings could be used to help other users—like the user of camera 2802—in the creation of more detailed virtual renditions of objects in the users' images. So, in one embodiment, a user could simply take one image of the front a basketball; upload the image; and previously stored images, renditions, or point-cloud mappings of the same type or make of the basketball could be used to construct the sides and back of a virtual rendition of the basketball.

Server 2804 represents one or more servers configured to execute different web-service software components and access different database structures of information. Server 2804 includes a processing unit and computer-storage media storing instructions to create and manage co-campaigns for multiple advertisers. While server 2804 is illustrated as a single box, one skilled in the art will appreciate that server 306 may, in fact, be scalable. For example, server 2804 may actually include multiple servers operating various portions of software that collectively generate virtual renditions of images or objects in images. Additionally, server 2804 may be configured to categorize virtual renditions and/or point-cloud mappings of objects or images based on general or specific classifications of the underlying objects, and also search for such and/or point-cloud mappings when queried by camera 2802.

Merging 3D and virtual renditions of objects with a rendition of an object captured by camera 2802 may be performed be performed by any of the devices illustrated (camera 2802, devices 2808, or server 2804) depending on the embodiment. In one embodiment, camera 2802 queries server 2804 for only images that are classified as containing a particular object recognized in an image captured by camera 2802. In response, server 2804 may transmit various images from other users of the object. Camera 2802, or a connected computing device, may be configured to perform virtual-rendition techniques like those described above to each image to generate 3D renditions of the object in each image. Camera 2802, or the connected computing device, may then merge the 3D rendition with a similarly generated 3D rendition of the object in the image captured by camera 2802 to create a composite rendition of the object, i.e., a rendition composed of multiple different renditions. Alternatively, in a different embodiment, the image captured by camera 2802 is simply transmitted to server 2804, which then queries for the additional images of the object, merges 3D or virtual renditions from those additional images with a virtual or 3D rendition of the object in the image captured by camera 2802, and then transmits a composite rendition of the object back to camera 2802 or a computing device connected thereto. In still another alternative, the image captured by camera 2802 may be digitized into a 3D or virtual rendition by camera 3802, and then digitization may be transmitted to server 3804 for merging with other renditions of the object from other images. In yet another embodiment, camera 2808 or an attached computing device may simply supply keywords of an object recognized in a captured image to server 2804, which then queries a database for renditions or images of the object and sends the renditions back to camera 2802 or an attached computing device for merging into a composite renditions. Thus, different embodiments will create composite renditions on either the client side (i.e., camera 2802 or an attached computing device) or on server 2804.

It should be noted again that various embodiments will use different recognition techniques to identify an object in an image. Edges of an object may be detected by examining color and/or depth variances at different points or pixels of the image. Also, facial and structure recognition algorithms may determine faces or objects in the image. For example, an algorithm may give more weight to elliptical-like structures in the middle of an image because such structures being in the middle may commonly be a face. Various over object- or image-recognition techniques may be used to identify the object. Moreover, server 2804 may be configured to use different matching algorithms and employ various error thresholds to locate previously uploaded images, objects in images, or renditions of objects in images.

Figure 29:
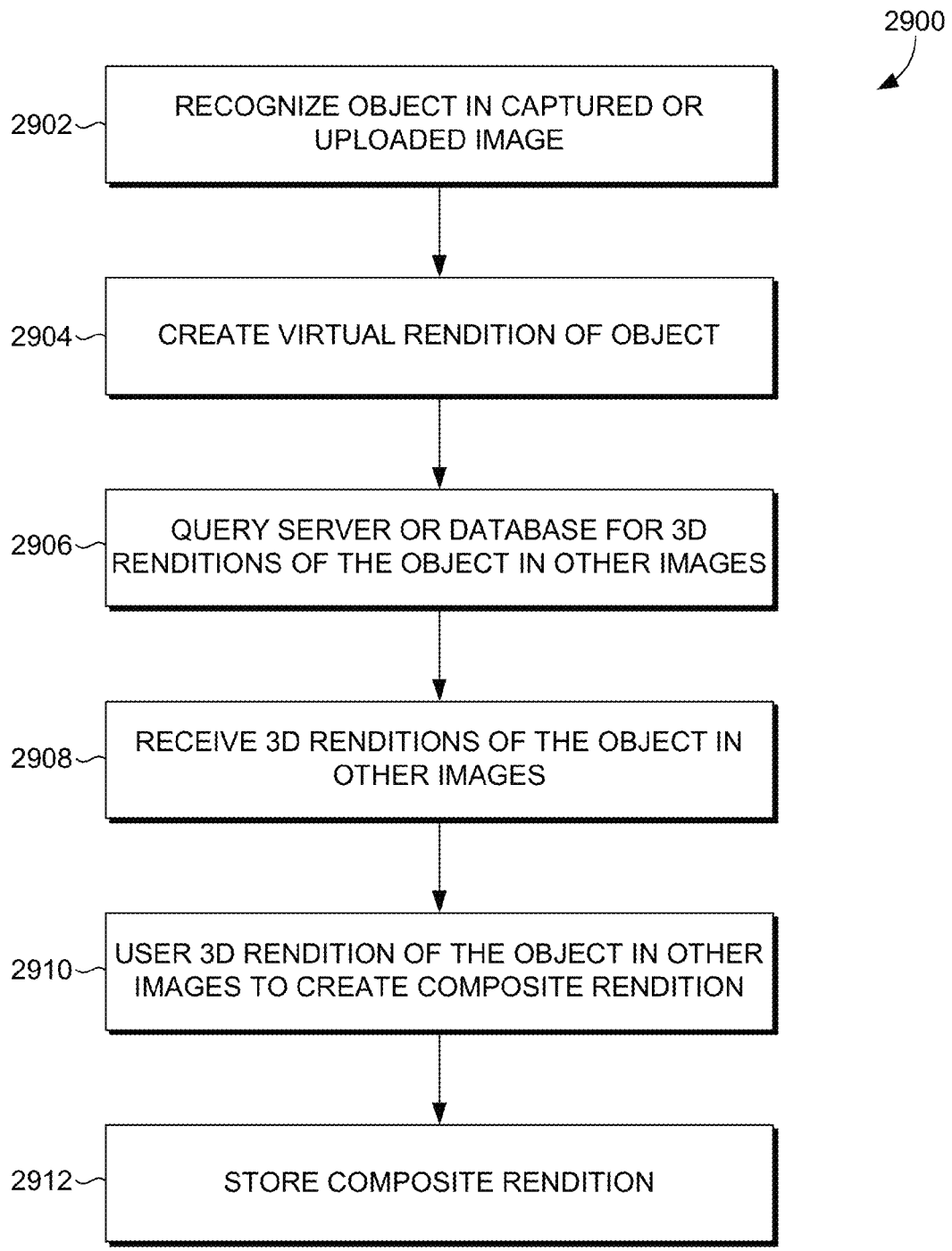
FIGS. 29 and 30 are diagrams of flow charts for digitizing an object in an image using other images, according to different embodiments.
Figure 30:
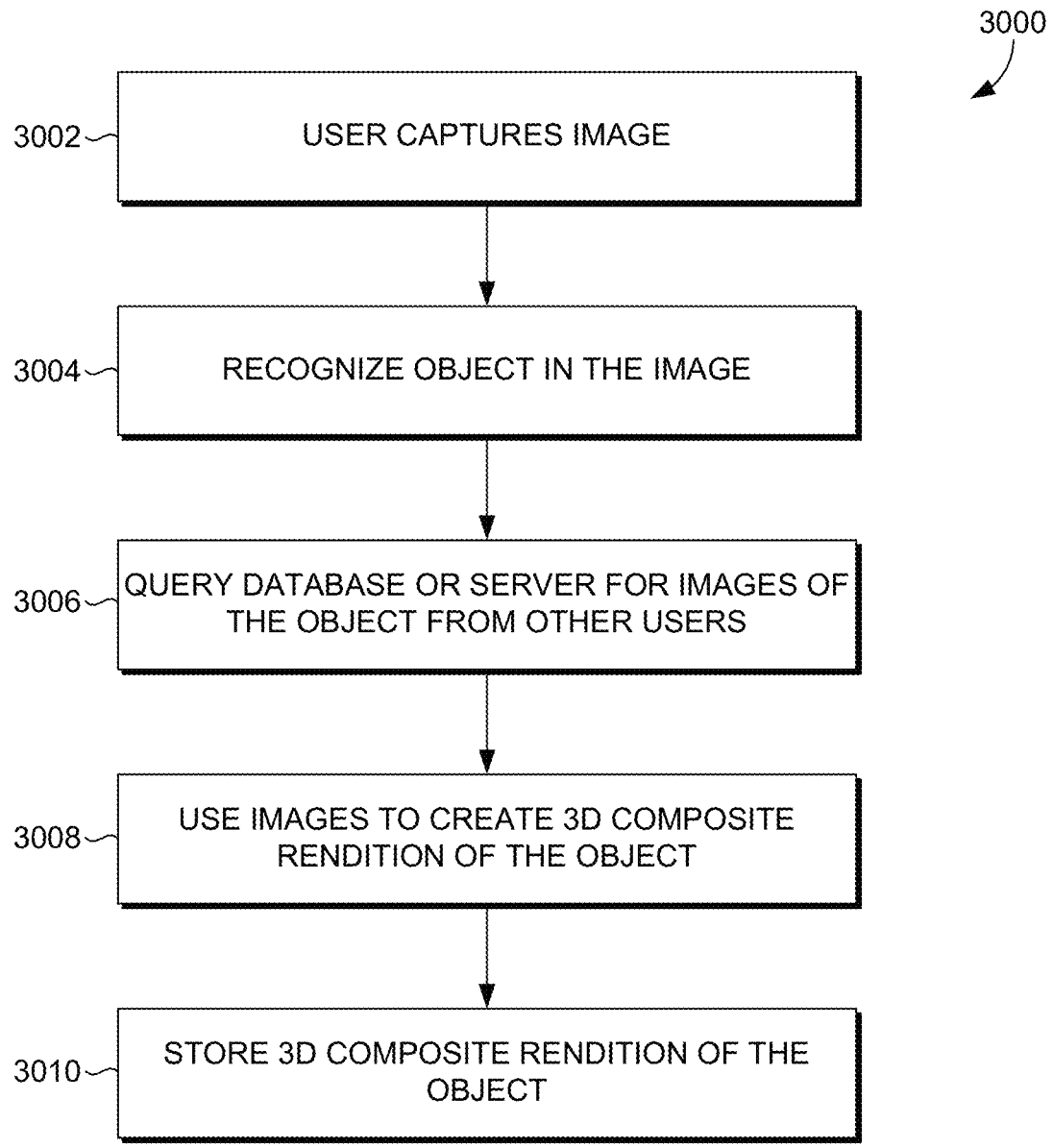

FIGS. 29-30 are diagrams of flow charts for digitizing an object in an image using other images, according to different embodiments. Looking first at FIG. 29, flow 2900 begins when an image is captured by a camera or computing device or when an image is uploaded to a server. As shown at 2902, the object is recognized in the image using any of the aforementioned object- or image-recognition techniques. A virtual rendition of the object, as depicted in the image, is created, as shown at 2904. For example, a point-cloud representation of side of a particular doll showing in an image may be created. A server or other database is queried for additional 3D renditions of the object from other images, as shown at 2906. The 3D renditions of the object from other images are received, as shown at 2908, and used to create a composite rendition of the object, as shown at 2910. A composite virtual rendition is simply a virtual rendition constructed from multiple 3D renditions, other virtual renditions, and/or point clouds. After being created, the composite rendition is saved to either a server or a client device, as shown at 2912.

Turning to FIG. 30, flow 3000 begins when a user captures an image, as shown at 3002. An object is recognized in the image, as shown at 3006. A database is queried for images of the object created from other uploaded images, as shown at 3006. Such a query may include keywords, classifications tagged to the object upon recognition, or other indicators of the object. The resultant images may of the object in other images are used to create a 3D composite rendition of the object, as shown at 3008, that is stored on either a server or a client device, as shown at 3010.

Many different arrangements of the various components depicted, as well as components not shown, are possible without departing from the scope of the claims below. Embodiments of our technology have been described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

The invention claimed is:

1. One or more computer hardware storage devices having computer-executable instructions embodied thereon that, when executed by one or more processors, cause the one or more processors to perform operations, the operations comprising:
    receiving an image of an object, the image having been captured by a first user using a camera associated with a client device;
    creating a virtual representation of the object based on the image;
    performing object recognition on the image to recognize the object;
    in response to recognizing the object from the image, querying a server-side database containing a plurality of three-dimensional renditions of objects to identify one or more three-dimensional renditions of the object created from other images captured by other users;
    receiving the one or more three-dimensional renditions in response to the querying;
    merging the virtual representation with the one or more three-dimensional renditions to create a composite rendition of the object; and
    causing a display of the composite rendition of the object on a display device associated with the client device.

2. The one or more computer hardware storage devices of claim 1, further comprising:
    identifying a shape of the object in the image;
    based on the shape, determining a classification associated with the object; and
    including the classification in a query to the database for the one or more three-dimensional renditions of the object.

3. The one or more computer hardware storage devices of claim 2, wherein the type associated with the object is a general description of the object.

4. The one or more computer hardware storage devices of claim 1, further comprising:
    identifying one or more indicia on the object in the image;
    based on the one or more indicia, determining a classification associated with the object; and
    including the classification in a query to the database for the one or more three-dimensional renditions of the object.

5. The one or more computer hardware storage devices of claim 4, wherein the one or more indicia includes at least one member of a group comprising one or more logos, one or more markings, one or more faces, one or more colors, and one or more surface patterns.

6. The one or more computer hardware storage devices of claim 1, wherein performing object recognition on the image to recognize the object further comprises analyzing color and depth data associated with the image.

7. The one or more computer hardware storage devices of claim 6, further comprising determining edges of the object from the color and depth data associated with the image.

8. The one or more computer hardware storage devices of claim 1, further comprising:
- determining one or more sizes of the object in the image from color and depth data associated with the image;
- using the one or more sizes to scale the one or more three-dimensional renditions of the object to generate scaled versions of the one or more three-dimensional renditions; and
- using the scaled versions of the one or more three-dimensional renditions in the merging of the virtual representation with the one or more three-dimensional renditions to create the composite rendition of the object.

9. The one or more computer hardware storage devices of claim 1, wherein the merging of the virtual representation with the one or more three-dimensional renditions to create the composite rendition of the object is performed on the client device.

10. The one or more computer-readable media computer hardware storage devices of claim 1, wherein the merging of the virtual representation with the one or more three-dimensional renditions to create the composite rendition of the object is performed on a server.

11. The one or more computer hardware storage devices of claim 1, wherein at least one of the one or more three-dimensional renditions comprises a point-cloud mapping of the object in one of the other images.

12. A method, performed by one or more computing devices, for generating a three-dimensional rendition of an object, the method comprising:
- receiving an image, the image having been captured by a first user using a camera associated with a client device;
- performing object recognition on the image to recognize an object in the image;
- in response to recognizing the object from the image, querying a server-side database of images to identify uploaded images of the object captured by other users;
- using the uploaded images and the image to create a three-dimensional composite rendition of the object; and
- causing a display of the three-dimensional rendition of the object on a display device associated with the client device.

13. The method of claim 12, wherein performing object recognition on the image to recognize the object in the image comprises:
- analyzing depth and color data associated with the image; and
- from the depth and color data, determining one or more edges of the object in the image.

14. The method of claim 13, wherein the one or more edges of the object are determined by identifying a disparity in color data between a first point of the image within the object and a second point of the image outside of the object.

15. The method of claim 13, wherein the one or more edges of the object are determined by identifying a disparity in distance data between a first point of the image within the object and a second point of the image outside of the object.

16. The method of claim 12, wherein the uploaded images of the object are selected to create the three-dimensional composite rendition of the object by the uploaded images capturing the object within a threshold error compared to the object in the image.

17. A method, performed by one or more computing devices, for generating a composite virtual rendition of an object, the method comprising:
- receiving an image captured by a user using a camera associated with a client device, the image including the object;
- querying one or more server-side databases for virtual renditions of the object from other images captured by other users;
- receiving the virtual renditions, the virtual renditions comprising point-cloud representations of the object from the other images;
- using a point-cloud representation of the object generated from the image and the virtual renditions to generate the composite virtual rendition of the object; and
- causing a display of the composite rendition of the object on a display device associated with the client device.

18. The method of claim 17, further comprising detecting the object in the image by comparing color data of the image for color or depth disparities.

19. The method of claim 17, further comprising scaling the virtual renditions to a particular size in order to generate the composite virtual rendition of the object.

20. The method of claim 17, wherein the camera is capable of capturing the image and depth data.

\* \* \* \* \*